US012640609B2

(12) United States Patent
Asaoka et al.

(10) Patent No.: US 12,640,609 B2
(45) Date of Patent: May 26, 2026

(54) MOTOR HAVING ROTOR-INTEGRATED COOLANT PASSAGE AND END-PLATE-FORMED COOLANT CAVITY

(71) Applicant: TOYOTA JIDOSHA KABUSHIKI KAISHA, Toyota (JP)

(72) Inventors: Hironori Asaoka, Okazaki (JP); Fumiaki Yamato, Okazaki (JP); Kiichi Yokoyama, Toyota (JP); Hiroki Kato, Toyota (JP); Kenta Tabuchi, Nisshin (JP); Hideaki Miyazono, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 18/530,434

(22) Filed: Dec. 6, 2023

(65) Prior Publication Data

US 2024/0195248 A1     Jun. 13, 2024

(30) Foreign Application Priority Data

Dec. 7, 2022    (JP) ................................. 2022-195892

(51) Int. Cl.
| | |
|---|---|
| *H02K 1/32* | (2006.01) |
| *H02K 1/276* | (2022.01) |
| *H02K 5/15* | (2006.01) |

(52) U.S. Cl.
CPC .............. *H02K 1/32* (2013.01); *H02K 1/276* (2013.01); *H02K 5/15* (2013.01)

(58) Field of Classification Search
CPC ............. H02K 1/32; H02K 1/276; H02K 5/15
See application file for complete search history.

(56) References Cited

U.S. PATENT DOCUMENTS

| | | | | |
|---|---|---|---|---|
| 2016/0261158 A1* | 9/2016 | Horii | ........................ | H02K 1/32 |
| 2018/0152078 A1* | 5/2018 | Yoshinori | ............ | H02K 1/2766 |
| 2020/0099265 A1 | 3/2020 | Yoshizawa | | |

FOREIGN PATENT DOCUMENTS

| | | | | | |
|---|---|---|---|---|---|
| DE | 102020106341 B4 * | 8/2022 | | ............... | H02K 1/32 |
| JP | 2009-273285 A | 11/2009 | | | |
| JP | 2009-303293 A | 12/2009 | | | |
| JP | 2010-220340 A | 9/2010 | | | |
| JP | 2010-239799 A | 10/2010 | | | |
| JP | 2020-108209 A | 7/2020 | | | |
| JP | 2022-129912 A | 9/2022 | | | |
| WO | 2015/087445 A1 | 6/2015 | | | |
| WO | 2018/181244 A1 | 10/2018 | | | |

* cited by examiner

*Primary Examiner* — Viet P Nguyen
(74) *Attorney, Agent, or Firm* — OLIFF PLC.

(57)     ABSTRACT

A motor may include: a stator with a coil; and a rotor radially inside the stator, wherein the rotor includes a rotor shaft, a core supported rotatably with the shaft, and a first end plate attached to a first end of the core, the core including a magnet held in the core, a magnet slot that holds a magnet, and a coolant path extending along an axial direction of the core, the coolant path disposed between a radially-inner end surface of the magnet and the magnet slot, and the first end plate including a flange radially outside the radially-inner end surface of the magnet, the flange protruding toward the core along the axial direction of the core, and the flange being configured to form a cavity between the first end plate and the first end, wherein the cavity delivers the coolant supplied from the rotor shaft to the coolant path.

11 Claims, 6 Drawing Sheets

MOTOR HAVING ROTOR-INTEGRATED COOLANT PASSAGE AND END-PLATE-FORMED COOLANT CAVITY

REFERENCE TO RELATED APPLICATION

This application claims priority from Japanese Patent Application No. 2022-195892 filed on Dec. 7, 2022. The entire content of the priority application is incorporated herein by reference.

TECHNICAL FIELD

The art disclosed herein relates to a motor.

BACKGROUND

A motor is mainly composed of a rotor core configured to rotate and a stator which imparts rotary force to the rotor core using magnetic force. The rotor core is a cylindrical body including a rotor shaft at its center and has both ends sealed by end plates. Coolant such as oil for cooling inside and outside the rotor core flows through the rotor shaft and reaches inside the rotor core via recesses defined on inner sides of the end plates (Japanese patent application publication no. 2010-239799).

SUMMARY

Such coolant supply through the recesses of the end plates may lead to an increase in the number of recesses or complication in patterns or layouts of the recesses in order to ensure efficiency of cooling the rotor core and of magnets secured in the rotor core. Processing such recesses leads to an increase in processing cost of end plates.

The present teachings provide an art configured to effectively cool magnets and a rotor core in a motor.

The art disclosed herein is embodied by a motor. The motor may comprise: a stator with a coil; and a rotor radially inside the stator. The rotor comprises a rotor shaft, a rotor core supported rotatably with the rotor shaft, and a first end plate attached to a first end of the rotor core. The rotor core comprises at least one magnet held in the rotor core, at least one magnet slot that holds the at least one magnet, and at least one coolant path extending along an axial direction of the rotor core, wherein of the at least one coolant path is disposed between a radially-inner end surface of the at least one magnet and the at least one magnet slot. The first end plate comprises a flange radially outside the radially-inner end surface of the at least one magnet, the flange protruding toward the rotor core along the axial direction of the rotor core, and wherein the flange is configured to form a cavity between the first end plate and the first end, wherein the cavity delivers the coolant supplied from the rotor shaft to the at least one coolant path.

According to the motor disclosed herein, the cavity is formed between the first end plate comprising the flange and the first end of the rotor core, and the coolant supplied from the rotor shaft can be supplied through the cavity to the coolant path(s). By configuring as such, the coolant can cool both the radially-inner end surface(s) of the magnet(s) held in the magnet slot(s) and the rotor core. Due to this, an increase and complication in recess processing on end plates can be suppressed or avoided while effectively cooling the magnet(s) and the rotor core.

The coolant supplied from the rotor shaft is caused to pass over the radially-inner end surfaces of the magnet(s) by centrifugal force and to be stored inside the flange positioned radially outside the radially-inner end surface(s). Due to this, the coolant can easily be delivered to the coolant path(s). Thus, effective cooling of the magnet(s) and the rotor core can be ensured.

DETAILED DESCRIPTION

Figure 1A:
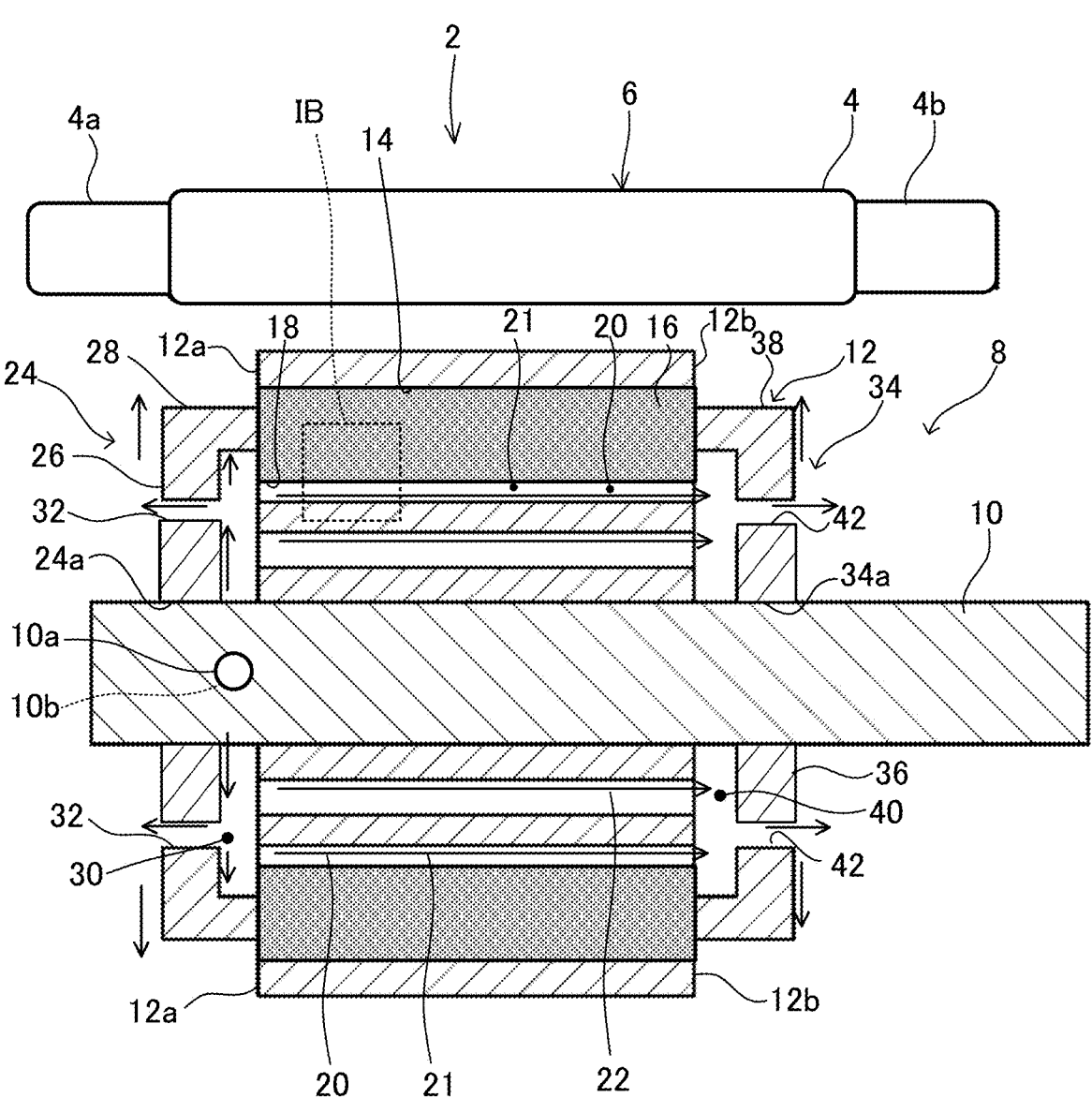
FIG. 1A illustrates an overview of a motor according to a first embodiment.

A motor disclosed herein may comprise: a stator with a coil; and a rotor radially inside the stator, wherein the rotor comprises a rotor shaft, a rotor core supported rotatably with the rotor shaft, and a first end plate attached to a first end of the rotor core, wherein the rotor core comprises at least one magnet held in the rotor core, at least one magnet slot that holds the at least one magnet, and at least one coolant path extending along an axial direction of the rotor core, wherein the at least one coolant path is disposed between a radially-inner end surface of the at least one magnet held in the rotor core and the at least one magnet slot, and wherein the first end plate comprises a flange radially outside the radially-inner end surface of the at least one magnet, the flange protruding toward the rotor core along the axial direction of the rotor core, and wherein the flange is configured to form a cavity between the first end plate and the first end, wherein the cavity delivers the coolant supplied from the rotor shaft to the at least one coolant path.

In an aspect of the present teachings, the at least one magnet may comprise a plurality of magnets, the at least one magnet slot may comprise a plurality of magnet slots, and the at least one coolant path may comprise a plurality of coolant paths. The cavity may deliver the coolant to the plurality of coolant paths for the plurality of magnets of the rotor core. By virtue of this configuration, the magnets and the rotor core can be effectively cooled. The cavity may be configured to deliver the coolant to the coolant paths for all the magnets which the rotor core comprises.

In an aspect of the present teachings, the first end plate may have a first coolant outlet defined on an inner side relative to the at least one coolant path in a radial direction of the rotor core. By virtue of this configuration, the coolant can be effectively supplied to the coolant path(s).

In an aspect of the present teachings, the motor disclosed herein may further comprise a second end plate attached to a second end of the rotor core, wherein the second end plate comprises a second coolant outlet having an opening overlapping at least partially with an opening of the first coolant outlet in the radial direction of the rotor core. By virtue of this configuration, the coolant having passed through the coolant path(s) can be utilized for cooling the rotor core and the stator. The second end plate may comprise a cavity communicating the plural coolant paths.

In an aspect of the present teachings, the motor disclosed herein may further comprise a second end plate attached to a second end of the rotor core, wherein the second end plate comprises a one-sided coolant outlet having an opening overlapping at least partially with an opening of the at least one coolant path in a radial direction of the rotor core. By virtue of this configuration, the coolant having passed through the coolant path(s) can be effectively supplied to the rotor core and the stator.

In this aspect, the rotor core may be configured to supply the coolant only in a direction from the first end to the second end of the rotor core and discharge the coolant only from the one-sided coolant outlet. By virtue of this configuration, directionality of the coolant can be regulated, and thus the magnet(s), the rotor core, and the stator can be effectively cooled. Also, pore processing on the first end plate can be omitted, and/or pore processing on the rotor shaft for the coolant(s) to pass therethrough can be decreased.

In an aspect of the present teachings, the one-sided coolant outlet may be configured so that the discharged coolant is directed to an exposed part of the coil connected to a power line. By virtue of this configuration, an end part of the coil that is exposed, for example where coil leads are arranged, can be effectively cooled.

In an aspect of the present teachings, the rotor may have a plurality of pawls protruding toward the radially-inner end surface of the at least one magnet and fix the at least one magnet, wherein the plurality of pawls is arranged along a direction in which the at least one coolant path extends. By virtue of this configuration, the magnet(s) are mechanically fixed to the magnet slot(s), and spaces for this fixing purpose can be used as the coolant path(s). In the present aspect, the plurality of pawls may be configured to press the radially-inner end surface of the at least one magnet by reaction force acting on the pawls. Due to this, the magnet(s) can be rigidly fixed. For example, tips of the plurality of pawls may be tilted toward a direction along which the coolant moves in the coolant path(s). Due to this, the pawls do not obstruct the movement of the coolant in the coolant path(s), and the radially-inner end surface(s) are not obstructed from being wetted by the coolant.

In an aspect of the present teachings, the at least one coolant path may extend along the axial direction of the rotor core between a circumferential end surface of the at least one magnet in a circumferential direction of the rotor core and the at least one magnet slot. By virtue of this configuration, the magnet(s) and the rotor core can more effectively be cooled.

In an aspect of the present teachings, the first end plate may have an inner edge protruding toward the rotor core along the axial direction of the rotor core and positioned on a radially inner side relative to the at least one coolant path. By virtue of this configuration, the first end plate can be stably fixed to the first end.

Hereinafter, embodiments of a motor disclosed herein will be described with reference to drawings. In the present teachings, when simply mentioning "radial direction/radially", it means a radial direction of a rotor core. When simply mentioning "circumferential direction/circumferentially", it means a circumferential direction of the rotor core. When simply mentioning "axial direction/axially", it means an axial direction of a rotor shaft.

First Embodiment

Figure 1B:
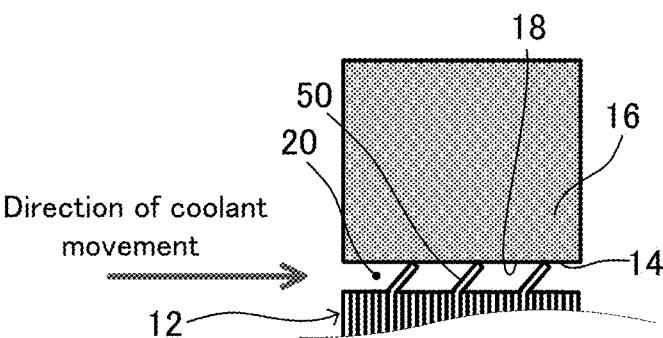
FIG. 1B is an enlarged view of a dotted section IB in FIG. 1A.
Figure 2:
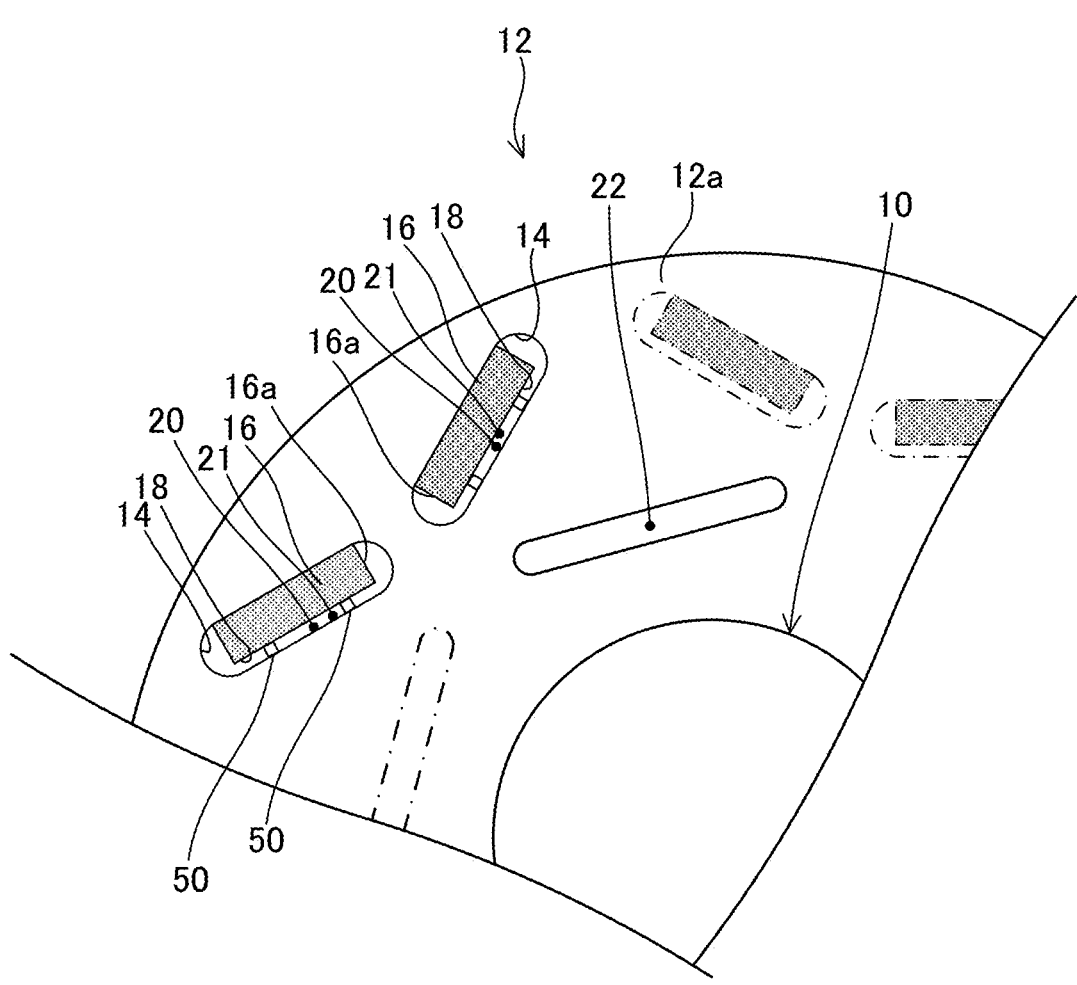
FIG. 2 illustrates an example (a part) of a layout pattern of magnets in a rotor core.

FIGS. 1 and 2 refer to a first embodiment. FIG. 1A illustrates a cross-sectional view of a motor 2 according to the present embodiment and a cross-sectional view of end plates, FIG. 1B illustrates an enlarged view of a dotted section IB in FIG. 1A, and FIG. 2 illustrates a layout pattern of magnet slots and magnets in the rotor core.

The motor 2 may not be particularly limited, but for example, may be a motor generator configured to function as electric motor or generator. For example, it can constitute a traction power source for a vehicle by itself or with an engine. Power output from the motor 2 as the electric motor is delivered to wheels as rotary force, by which the vehicle can run. On the other hand, when the vehicle regenerates, the motor 2 is driven as the generator by the rotary force of the vehicle, and the generated power is stored in a battery via an inverter not shown.

As shown in FIG. 1A, the motor 2 comprises a cylindrical stator 6 and a rotor 8 disposed radially inside the stator 6 with a predetermined interval from the stator 6. In FIG. 1A, illustration of a part of the stator 6 is omitted.

A coil 4 is mounted on the stator 6. For example, as shown in FIG. 1A, both ends of the coil 4 are exposed ends 4a,4b where covering is removed for connection to power lines.

The rotor 8 is mainly composed of a rotor shaft 10, a rotor core 12 rotatably fixed to the rotor shaft 10, and end plates 24, 34. The rotor shaft 10 is supported by a housing (not shown) of the motor 2 which serves as bearings. Flow paths for coolant such as torque oil are defined inside the rotor shaft 10. Further, two coolant outflow ports 10a, 10b for supplying the coolant are disposed at an end 12a of the rotor core 12 at radially symmetrical positions.

The rotor core 12 is mainly composed of laminated steel plates, which are electromagnetic steel plates of magnetic substance such as iron or iron alloy that are laminated along an axial direction of the rotor core 12. The laminated steel plates are fixed to the rotor shaft 10 by a center hole passing through the rotor core 12 along the axial direction.

The rotor core 12 comprises a plurality of magnet slots 14 extending through the rotor core 12 in the axial direction of the rotor core 12 along an outer circumferential side of the rotor core 12. A magnet (permanent magnet) 16 is accommodated in each of the magnet slots 14. A layout pattern for the magnet slots 14 in the rotor core 12 is not particularly limited, but for example, as shown in FIG. 2, two magnets 16 each having a rectangular cross-sectional shape extending in a circumferential direction of the rotor core 12 are arranged in a pair to constitute one pole. Specifically, facing ends 16a of the two magnets 16 that face each other are arranged close to each other. The pair of magnets 16 is not limited particularly, but as an example, the facing ends 16a are angled symmetrically to each other to be directed to the rotor shaft 10 in a substantially V shape. This is not particularly limiting, but six to eight poles are formed in the rotor core 12, for example.

Shapes of the magnet slots 14 and the magnets 16 are not particularly limited, but for example, the magnets 16 each is a columnar body which has the rectangular cross-sectional shape and extends in the axial direction of the rotor core 12, and the magnet slots 14 each accommodates a corresponding one of such magnets 16 and has an interval 21 at least on an end surface 18 facing inward radially of the rotor core 12 (radially-inner end surface 18).

A method for fixing each magnet 16 in the corresponding slot 14 is not particularly limited, and may be mechanical and/or by using a resin material, for example. In the mechanical fixing method, as shown in FIG. 1B and FIG. 2 for example, in each of the intervals 21 from the radially-inner end surface 18 of the magnet 16 accommodated in the magnet slot 14, there may be plural pawls 50 projecting toward the end surface 18 in a direction along which each slot 14 extends (i.e., axial direction).

Also, as shown in FIG. 1B, the pawls 50 may have tips directed toward the end surface 18 of the magnet 16 be tilted in each of coolant paths 20. According to such configuration of the pawls 50, the pawls 50 are biased toward the end surface 18 by reaction force acting on the pawls 50 by being bent in such tilting direction, as a result of which each magnet 16 is pressed radially outward. Further, the tips of the pawls 50 may be tilted to a direction along which the coolant travels in the coolant paths 20. According to such tilted configuration, the pawls 50 do not obstruct the coolant from traveling or wetting the end surfaces 18, by which effect of cooling the magnets 16 by the coolant can be sufficiently secured.

Figure 3:
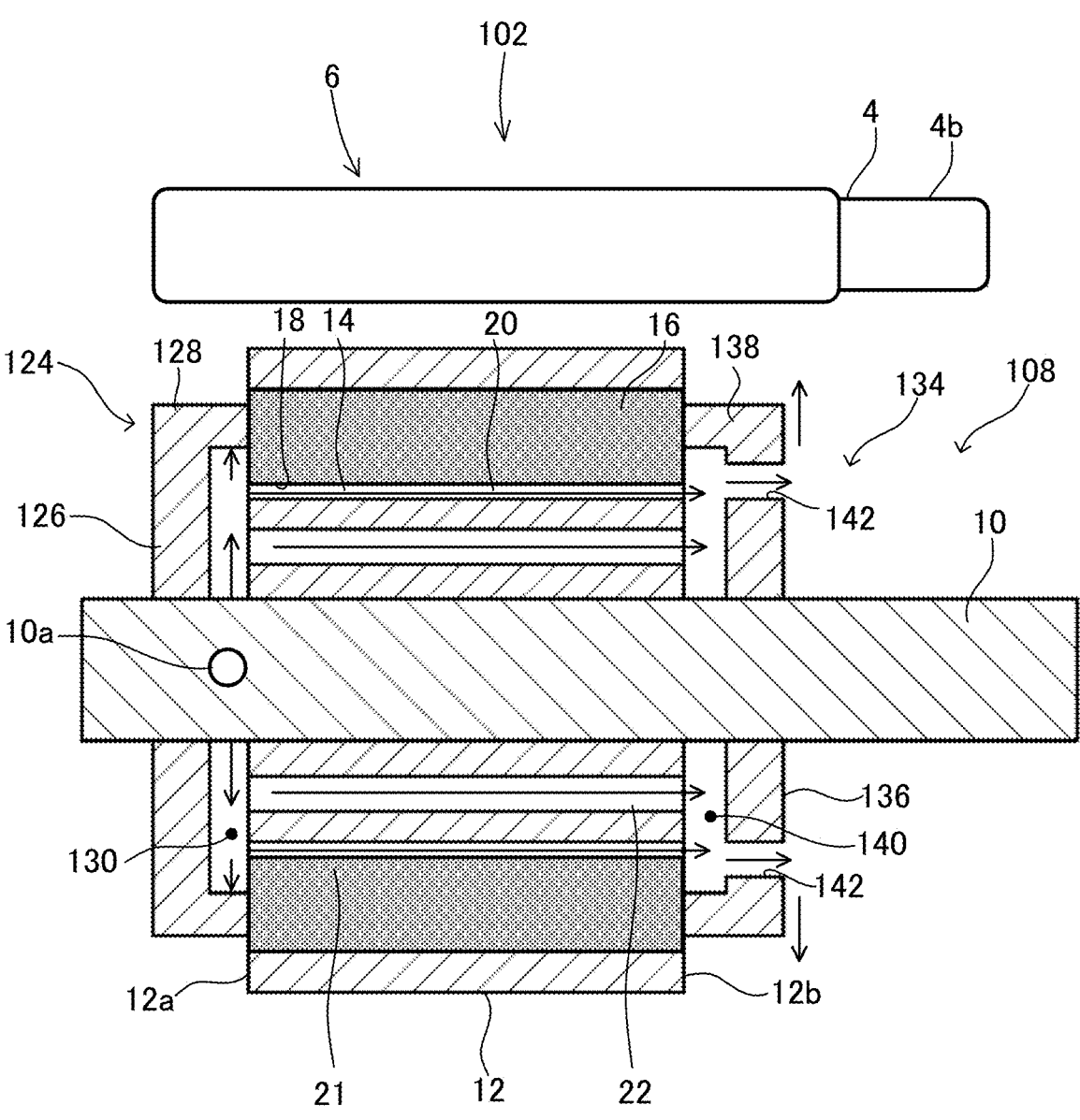
FIG. 3 illustrates an outline of a motor according to a second embodiment.

For example also, in the case of fixing by using the resin material, the magnets 16 may be fixed to the corresponding magnet slots 14 by arranging a nonmagnetic resin material, such as epoxy resin, which is foamable or expansive and then letting the material foam or expand by means of heating for example. Such resin material is known. As shown in FIG. 3 for example, in the intervals 21 each between the end surface 18 of the magnet 16 and the magnet slot 14, a layer of resin comprising communicating pores formed by foaming for example can be formed as a layer for fixing.

The coolant paths 20 extending in the axial direction of the rotor core 12 are defined between the respective magnet slots 14 and the respective magnets 16. The coolant paths 20 are constituted of at least the intervals 21 each between the end surface 18 of the magnet 16 and the magnet slot 14. These intervals 21 simply need to be configured to allow the coolant to pass therethrough, and as mentioned above, even when the intervals 21 comprise the aforementioned pawls 50 and/or the resin layer with the communicating pores, the intervals 21 can be used to effectively serve as the coolant paths 20.

Further, the rotor core 12 comprises other coolant paths 22 on a radially inner side relative to the magnet slots 14. Such layout pattern of the coolant paths 22 is not particularly limited, but they simply need to be disposed at equal intervals around the rotor shaft 10, and may be of a suitable number of two or more.

The ends 12a, 12b of the rotor core 12 has end plates 24, 34 respectively attached thereto (in the present teachings, the end 12a of the rotor core 12 encompasses areas where the magnet slots 14 and the magnets 16 are exposed. The same applies to the end 12b as well). The end plate 24 comprises a flat plate 26 being circular with a smaller diameter than an outer circumferential edge of the end 12a of the rotor core 12 and a flange 28 projecting from the plate 26 toward the rotor core 12 along the axial direction of the rotor core 12. As a result of this, the end plate 24 has a cap shape as a whole. The end plate 24 is fixed to the rotor shaft 10 through a mounting hole 24a at its center and also attached to the end 12a of the rotor core 12 with the flange 28 abutting the end 12a. The end 12a is an example of a first end of a rotor core disclosed herein and the end plate 24 is an example of a first end plate disclosed herein.

The flange 28 of the end plate 24 projects a predetermined height toward the rotor core 12 along the axial direction over an entirety of an outer circumference radially outside beyond the end surfaces 18 of the magnets 16 at the end 12a of the rotor core 12. As a result of this, a cavity 30 having the height of the flange 28 is defined in a range between the end plate 24 and the end 12a and extending around the rotor shaft 10 and from the rotor shaft 10 to a part radially outside beyond the end surfaces 18 of the magnets 16.

An outer edge of the cavity 30 defined by the flange 28 simply needs to be radially outside beyond at least a part of the end surfaces 18 of the magnets 16. The outer edge of the cavity 30 is beyond the end surfaces 18 of the magnets 16 as shown in FIG. 1A, and it may not reach radially-outer end surface(s) of the magnet(s) 16 opposite from these end surfaces 18, or alternatively the outer edge of the cavity 30 may extend radially beyond these radially-outer end surfaces. The configuration of the outer edge of the cavity 30 may be suitably determined based on where the coolant paths 20 (to be described later) are arranged.

The motor 2 as shown in FIG. 1A is configured such that the cavity 30 is configured to deliver the coolant from the coolant outflow port 10a defined on the rotor shaft 10 to all the coolant paths 20 defined for all the magnets 16 which the rotor core 12 comprises.

As shown in FIG. 1A, the plate 26 of the end plate 24 comprises coolant outlets 32 on a radially inner side relative to the coolant paths 20 in the radial direction of the rotor core 12. The coolant outlets 32 are located on a radially inner side relative to openings of the coolant paths 20 so that they do not overlap the openings of the coolant paths 20. Two coolant outlets 32 are arranged opposed from each other in a radial direction of the plate 26. The coolant outlets 32 are configured such that the discharged coolant is directed toward the exposed end 4a where coil ends of the coil 4 of the stator 6 are exposed. The coolant outlets 32 are arranged at spots which do not overlap the spots of the coolant outflow ports 10a, 10b on the rotor shaft 10.

As shown in FIG. 1A, the end plate 34 attached to the end 12b of the rotor core 12, similar to the end plate 24, comprises a flat plate 36 being circular with a smaller diameter than the end 12b of the rotor core 12 and a flange 38 projecting from the plate 36 toward the rotor core 12 along the axial direction of the rotor core 12. As a result of this, the end plate 34 has a cap shape as a whole. The end plate 34 is fixed to the rotor shaft 10 through a mounting hole 34a and also is attached to the end 12b of the rotor core 12 with the flange 38 abutting the end 12b. The end 12b is an example of a second end of the rotor core disclosed herein and the end plate 34 is an example of a second end plate disclosed herein.

Further, as shown in FIG. 1A, similar to the end plate 24, the end plate 34 defines a cavity 40 between the end plate 34 and the end 12b, and the cavity 40 communicates with all the coolant paths 20 defined for all the magnets 16 which the rotor core 12 comprises.

As shown in FIG. 1A, the plate 36 of the end plate 34 comprises two coolant outlets 42 on a radially inner side relative to the coolant paths 20 of the rotor core 12. The coolant outlets 42 are positioned so that they substantially overlap the two coolant outlets 32 defined on the end plate 24. The coolant outlets 42 are configured such that the discharged coolant is directed toward the exposed end 4b where the coil ends of the coil 4 of the stator 6 are exposed. Alternatively, the end plate 34 may have the same configuration as the end plate 24. The coolant outlets 42 are an example of a second coolant outlet disclosed herein.

Next, coolant flow on how the coolant flows when the motor 2 configured as such operates will be described with reference to FIG. 1A.

In FIG. 1A, directions in which the coolant flows are shown by arrows. As shown in FIG. 1A, the coolant is supplied from the two coolant outflow ports 10a, 10b of the rotor shaft 10 to the cavity 30 between the end plate 24 and the end 12a. The coolant is caused to reach the flange 28 defining the flange 30 and/or a vicinity thereof by centrifugal force generated by the rotation of the rotor core 12.

The coolant delivered to the flange 28 of the cavity 30 and the vicinity thereof then reaches the coolant paths 20 being the intervals 21 each between the magnet slot 14 and the end surface 18 of the magnet 16. Further, the coolant reaches the coolant paths 22. Since the cavity 30 communicates with all the coolant paths 20, 22 for all the magnets 16 which the rotor core 12 comprises, the coolant easily reaches all the coolant paths 20 and then travels through the respective coolant paths 20 to the end 12*b*. In addition, since the coolant outlets 32 are offset from a direction in which the coolant is discharged (radial direction) from the coolant outflow ports 10*a*, etc. and also disposed on the radially inner side relative to the coolant paths 20, the coolant once having reached the flange 28 of the cavity 30 is preferentially delivered to the coolant paths 20.

Such movement of the coolant in the coolant paths 20 causes the end surfaces 18 of the magnets 16 and insides of the magnet slots 14 to be cooled by the coolant. Further, the coolant reaches all the coolant paths 22 and travels through the respective coolant paths 22 to the end 12*b*, by which the rotor core 12 is cooled.

Once the coolant has passed through the coolant paths 20, 22 and then reached the cavity 40 on the opposite side, the coolant is further discharged from the coolant outlet 42 outside the rotor 8 toward the exposed end 4*b* of the coil 4. Due to this, the exposed end 4*b* where heating of the coil 4 is required is cooled, and the coolant is reused again.

The coolant delivered to the flange 28 of the cavity 30 or the vicinity thereof by the centrifugal force is also discharged from the coolant outlets 32 in the opposite direction from the coolant paths 20 to reach the exposed end 4*a*. Due to this, the rotor core 12 and the stator 6 are cooled, and then reused again.

That is, the end plate 24 is configured to supply the coolant by comprising the flange 28, and thus processing is easier than when recesses, for example, are formed. Also, since there is no need to form recesses on the end plate 24, the flat plate 26 of the end plate 24 can be made thin. Further, the flange 28 of the cavity 30 and the vicinity there of have a recess shape being open toward the rotor shaft 10 in combination with the end 12*a*, by which the coolant can be kept by the centrifugal force in the recess part.

According to the present embodiment, the end surfaces 18 of the magnets 16 and the rotor core 12 can be cooled by comprising the cavity 30 between the end plate 24 and the end 12*a* and causing the coolant to reach all the coolant paths 20 for all the magnets 16 without forming many complicated recesses. According to the present embodiment, due to the presences of the cavity 30 which supplies the coolant to all the coolant paths 20, 22 and the cavity 40 which communicates with all the coolant paths 20, 22, it is possible to supply the coolant in greater amount. Effects brought by the end plate 24 defining the cavity 30 are also applied to the end plate 34 which defines the cavity 40.

Although in the above embodiment, the cavity 30 is configured to supply the coolant to all the coolant paths 20, the cavity 30 simply needs to be configured to supply the coolant to one or more of the coolant paths 20. For example, when the coolant outflow ports 10*a*, 10*b* are two, the coolant paths 20 may be divided in two half circumferential sections (circumferentially divided in two) of the rotor core 12 in accordance with the number (two) of the coolant outflow ports 10*a*, 10*b*. For example, when eight poles are formed by sixteen magnets 16, two cavities 30 each of which is configured to supply the coolant to eight coolant paths 20 may be defined. In this case, a rim of a predetermined height which extends from the rotor shaft 10 and reaching the flange 28 may be arranged relative to the plate 26 in order to prepare two partitioned cavities 30. This rim allows the cavities 30 to be defined and the end plate 24 to be reinforced.

Although in the above embodiment the end plates 24, 34 each comprise the circular flat plate 26, 36 and the flange 28, 38, the art disclosed herein is not limited to this configuration. For example, as a whole, the end plates 24, 34 each may be configured such that it extends axially outward from the end 12*a*, 12*b* in a dome shape or a dish shape.

Although in the above embodiment the intervals 21 each between the end surface 18 of the magnet 16 and the magnet slot 14 are used as the coolant paths 20, this is not limiting. For example, an interval may be arranged between a circumferential end surface of each of the magnet(s) 16 in a circumferential direction of the rotor core 12 and the corresponding magnet slot 14, and this interval may be used as the coolant path. Furthermore, an interval may be arranged between a radially-outer end surface of each of the magnet(s) 16 and the corresponding magnet slot 14, and this interval may be used as the coolant path. Such various types of coolant paths may be used alone or in combination of two or more.

Although in the above embodiment the coolant outflow ports 10*a*, 10*b* are arranged only on the end 12*a* side of the rotor core 12 in the rotor shaft 10 and the flow direction of coolant is defined to flow from the end 12*a* to the end 12*b*, the art disclosed herein is not limited to this configuration. For example, coolant outflow port(s) may be arranged on an end 12*b* side as well so that the flowing direction in the rotor core 12 is bidirectional.

Second Embodiment

FIG. 3 refers to a second embodiment. FIG. 3 illustrates a cross-sectional view of a motor 102 according to a present embodiment, and cross-sectional views of end plates 124, 134. In the following description, descriptions of configurations shared with the first embodiment will be omitted or simplified, and also members shared with the first embodiment will be described with same reference numerals.

The motor 102 comprises a stator 6 and a rotor 108. The rotor 108 is mainly composed of a rotor shaft 10, a rotor core 12, and the end plates 124, 134.

The rotor core 12 has ends 12*a*, 12*b* to which respectively the end plates 124, 134 are fixed. The end plate 124 comprises a flat plate 126 being circular with a smaller diameter than an outer circumferential edge of the end 12*a* of the rotor core 12 and a flange 128 projecting from the plate 126 toward the end 12*a* along the axial direction of the rotor core 12.

The flange 128 of the end plate 124 projects a predetermined height toward the end 12*a* over an entirety of an outer circumference radially outside beyond end surfaces 18 of magnets 16 at the end 12*a* of the rotor core 12, by which a cavity 130 is formed.

As shown in FIG. 3, the plate 126 of the end plate 124 does not comprise a coolant outflow port for discharging the coolant. Due to this, pore processing can be omitted. Also, since there is no coolant outflow ports, the coolant supplied to the cavity 130 can be supplied to coolant paths 20, 22 at a greater amount, as a result of which the magnets 16 and the rotor core 12 can be more effectively cooled.

The end plate 134 comprises, similar to the end plate 124, a flat plate 136 being circular with a smaller diameter than the end 12*b* of the rotor core 12 and a flange 138 projecting from the plate 136 toward the end 12*b*. Due to this, a cavity 140 is defined between the end plate 134 and the end 12*b*.

As shown in FIG. 3, the end plate 134 comprises three coolant outlets 142 at equal intervals in a circumferential direction, in which the three coolant outlets 142 have openings each of which extends at least partially overlapping openings of the coolant paths 20 radially as well as to a part radially outside the openings of the coolant paths 20. Here in the cross-section shown in FIG. 3, two of the three coolant outlets 142 are shown. These coolant outlets 142 are directed to an exposed end 4*a* where covering is removed for connection to lead wires of a coil 4 of the stator 6. The coolant outlets 142 are opened radially outside the coolant paths 20 while partially overlapping the coolant paths 20, resulting in higher directionality toward the exposed end 4*a* and accordingly higher cooling performance. Also, there are the three coolant outlets 142, resulting in higher coolant discharge efficiency. The coolant outlets 142 are an example of one-sided coolant outlet disclosed herein.

According to the present embodiment, the coolant can be supplied to the exposed end 4*a* of the coil 4 at a greater amount because the end plate 124 fixed to the end 12*a* does not comprise coolant outlets, the end plate 134 fixed to the end 12*b* only comprises the three coolant outlets 142, and the three coolant outlets 142 partially overlap the coolant paths 20 in the radial direction. Further, the coolant outlets 142 are positioned more on the outer side of the radial direction than the coolant paths 20, resulting in higher directionality toward the exposed end 4*a* and accordingly more effective cooling of the exposed end 4*a*.

Although in the above embodiment the coolant outlets 142 are three, for more effective cooling efficiency of the exposed end 4*a* the coolant outlets 142 may be four or more, five or more, or six or more for example, at equal intervals in the circumferential direction.

The layout of the coolant outlets 142 in the above embodiment may be replaced with the coolant outlets 42 according to the first embodiment. Further, in the above embodiment, the features shared with the first embodiment may be implemented in the respective configurations described in the first embodiment.

Third Embodiment

Figure 4:
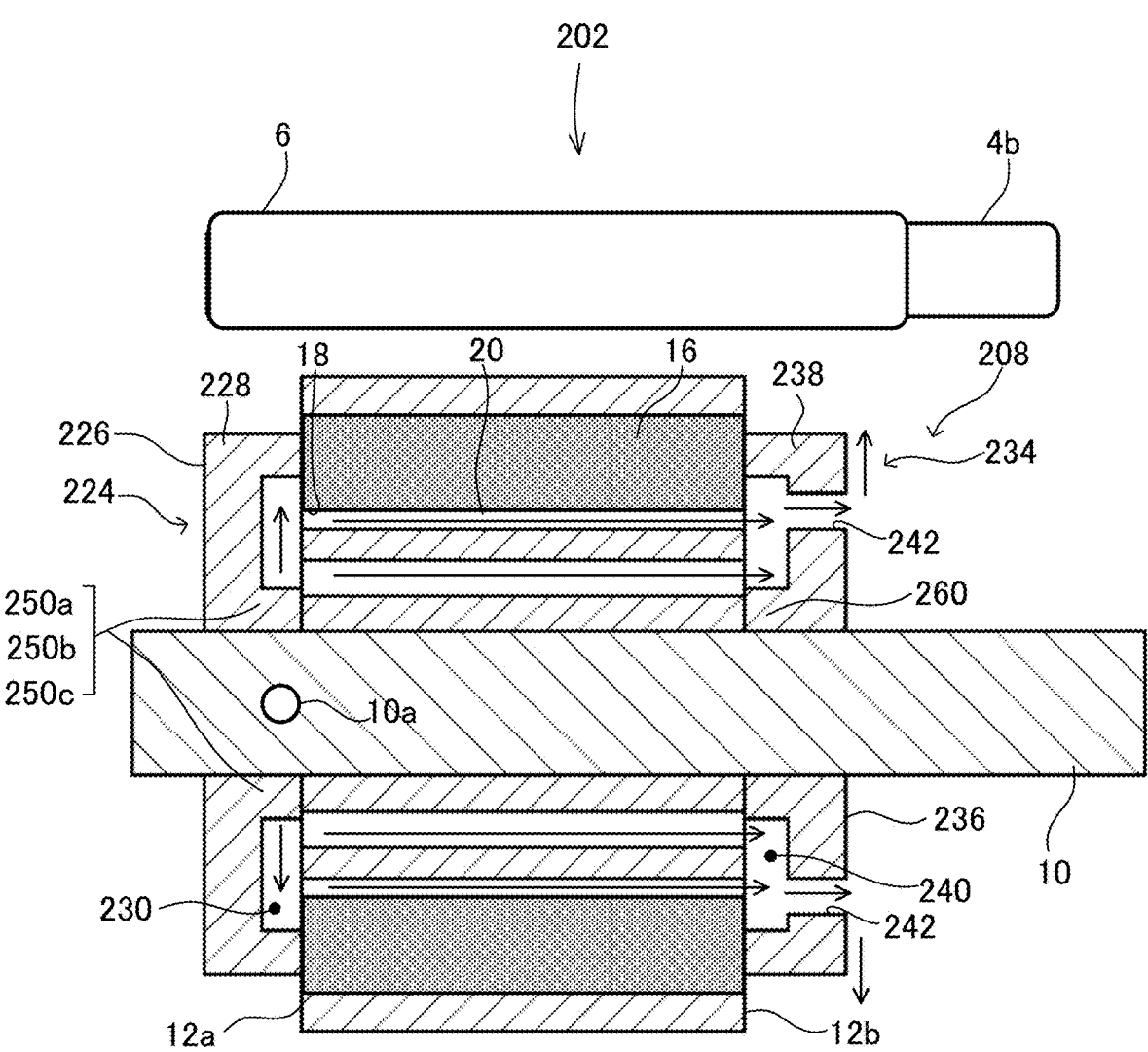
FIG. 4 illustrates an overview of a motor according to a third embodiment.
Figure 5:
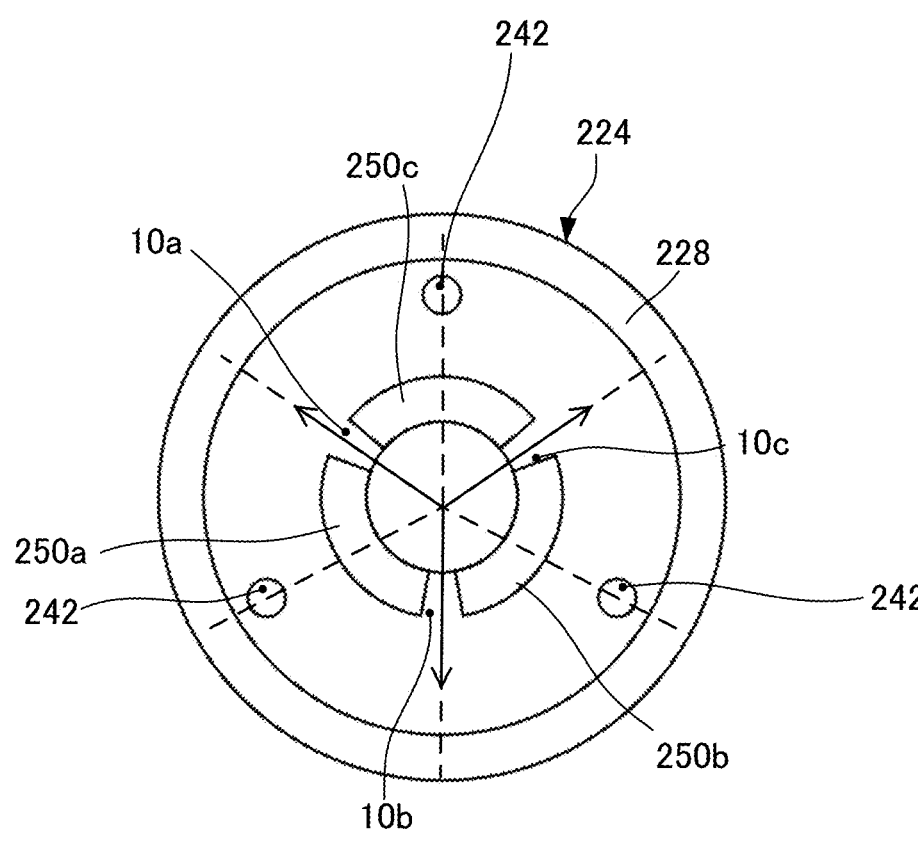
FIG. 5 illustrates a plan view seeing an end plate according to a third embodiment from a rotor core end.

FIGS. 4 and 5 refer to a third embodiment. FIG. 4 illustrates a cross-sectional view of a motor 202 according to the present embodiment and cross-sectional views of end plates 224, 234. FIG. 5 illustrates a plan view on an end 12*a* side of the end plate 224. In the following description, descriptions of configurations shared with the first embodiment will be omitted or simplified, and also members shared with the first embodiment and the second embodiment will be described with same reference numerals.

As shown in FIG. 4, the motor 202 comprises a stator 6 and a rotor 208. The rotor 208 is mainly composed of a rotor shaft 10, a rotor core 12, and the end plates 224, 234.

The rotor core 12 has ends 12*a*, 12*b* to which the end plates 224, 234 are respectively fixed. The end plate 224 comprises a flat plate 226 being circular with a smaller diameter than an outer circumferential edge of the end 12*a* of the rotor core 12 and a flange 228 projecting from the plate 226 toward the end 12*a*.

The flange 228 of the end plate 224 defines a cavity 230 between the end 12*a* and the flange 228. As shown in FIG. 4, the plate 226 of the end plate 224 comprises inner edges 250*a*, 250*b*, 250*c* projecting toward the end 12*a* and extending partially along an outer circumference of the rotor shaft 10 on the radially inner side relative to the coolant paths 20. As shown in FIGS. 4 and 5, each of the inner edges 250*a* to 250*c* is in contact with the end 12*a* so that they contribute to stable fixing of the end plate 224 to the end 12*a* and the rotor core 12.

As shown in FIG. 5, the inner edges 250*a*, 250*b*, 250*c* are arranged at intervals around the rotor shaft 10 so that they do not interfere with discharge of the coolant from coolant outlets 10*a*, 10*b*, 10*c* of the rotor shaft 10.

As shown in FIG. 4, the end plate 234 comprises, similar to the end plate 224, a flat plate 236 and a flange 238 projecting from the plate 236 toward the end 12*b*, by which a cavity 240 is defined between the end plate 234 and the end 12*b*.

As shown in FIG. 4, the end plate 234 comprises three coolant outlets 242 having openings each of which extends at least partially overlapping openings of the coolant paths 20 radially as well as to a spot radially outside the openings of the coolant paths 20. The coolant outlets 242 are an example of one-sided coolant outlet disclosed herein. Further, as shown in FIGS. 4 and 5, the plate 236 of the end plate 234 comprises an inner edge 260 on the radially inner side relative to the coolant paths 20 and extending along the outer circumference of the rotor shaft 10 and along the axial direction of the rotor core 12 toward the rotor core 12. The inner edge 260 is in contact with the end 12*b* so that it contributes to stable fixing of the end plate 234 to the end 12*b* and the rotor core 12.

According to the present embodiment, the end plates 224, 234 respectively comprise the inner edges 250*a* to 250*c* and 260, by which the end plates 224, 234 are stably fixed to the rotor core 12. Further, the plurality of coolant outflow ports 10*a* to 10*c* are arranged on the rotor shaft 10 at intervals from each other to allow the coolant to be discharged therefrom, and thus the supply of the coolant to the cavity 230 is not obstructed.

Although in the above embodiment the three inner edges 250*a* to 250*c* on the end 12*a* side are offset from the three coolant outlets 10*a* to 10*c*, the inner edges may be divided in a greater number. Here, the rotor core 12 can be balanced by comprising at least two inner edges. Although in the above embodiment the single inner edge 260 is arranged entirely around the outer circumference of the rotor shaft 10 on the end 12*b* side since the end 12*b* side does not comprise coolant outlets from the rotor shaft 10, the art disclosed herein is not limited to this configuration. When the end 12*b* side comprises coolant outlet(s) from the rotor shaft 10, there may be a plurality of inner edges depending on an arrangement of such coolant outlet(s), as appropriate. Further, only one of the ends 12*a*, 12*b* may comprise inner edge(s), as appropriate.

The inner edges 250*a* to 250*c*, 260 in the above embodiment may be implemented respectively in the end plates 24, 34 according to the first embodiment and the end plates 124, 134 according to the second embodiment. Further, in the above embodiment, the components shared with the first embodiment and the second embodiment may be implemented in the respective configurations described in the first embodiment and the second embodiment.

The present teachings include following items based on the above description.

[Item 1] A motor comprising: a stator with a coil; and a rotor radially inside the stator, wherein the rotor comprises a rotor shaft, a rotor core supported rotatably with the rotor shaft, and a first end plate attached to a first end of the rotor core, wherein the rotor core comprises at least one magnet held in the rotor core, at least one magnet slot that holds the at least one magnet, and at least one coolant path extending along an axial direction of the rotor core, wherein the at least one coolant path is disposed between a radially-inner end surface of the at least one magnet and the at least one magnet slot, and wherein the first end plate comprises a flange radially outside the radially-inner end surface of the at least one magnet, the flange protruding toward the rotor core along the axial direction of the rotor core, and wherein the flange is configured to form a cavity between the first end plate and the first end, wherein the cavity delivers the coolant supplied from the rotor shaft to the at least one coolant path.

[Item 2] The motor according to item 1, wherein the at least one magnet comprises a plurality of magnets, the at least one magnet slot comprises a plurality of magnet slots, and the at least one coolant path comprises a plurality of coolant paths, and the cavity delivers the coolant to the plurality of coolant paths for the plurality of magnets of the rotor core.

[Item 3] The motor according to item 1, wherein the first end plate has a first coolant outlet defined on an inner side relative to the at least one coolant path in a radial direction of the rotor core.

[Item 4] The motor according to item 3, further comprising a second end plate attached to a second end of the rotor core, wherein the second end plate comprises a second coolant outlet having an opening overlapping at least partially with an opening of the first coolant outlet in the radial direction of the rotor core.

[Item 5] The motor according to item 1, further comprising a second end plate attached to a second end of the rotor core, wherein the second end plate comprises a one-sided coolant outlet having an opening overlapping at least partially with an opening of the at least one coolant path in a radial direction of the rotor core.

[Item 6] The motor according to item 5, wherein the rotor core is configured to supply the coolant only in a direction from the first end to the second end of the rotor core and discharge the coolant only from the one-sided coolant outlet.

[Item 7] The motor according to item 6, wherein the one-sided coolant outlet is configured so that the discharged coolant is directed to an exposed part of the coil connected to a power line.

[Item 8] The motor according to item 1, wherein the rotor has a plurality of pawls protruding toward the radially-inner end surface of the at least one magnet and fix the at least one magnet, wherein the plurality of pawls is arranged along a direction in which the at least one coolant path extends.

[Item 9] The motor according to item 8, wherein the plurality of pawls is configured to press the radially-inner end surface of the at least one magnet by reaction force acting on the pawls.

[Item 10] The motor according to item 9, wherein tips of the plurality of pawls are tilted toward a direction along which the coolant moves in the at least one coolant path.

[Item 11] The motor according to item 1, wherein the at least one coolant path extends along the axial direction of the rotor core between a circumferential end surface of the at least one magnet in a circumferential direction of the rotor core and the at least one magnet slot.

[Item 12] The motor according to item 1, wherein the first end plate has an inner edge protruding toward the rotor core along the axial direction of the rotor core and positioned on a radially inner side relative to the at least one coolant path.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A motor comprising:

a stator with a coil; and a rotor radially inside the stator, wherein the rotor comprises a rotor shaft, a rotor core supported rotatably with the rotor shaft, and a first end plate attached to a first end of the rotor core, wherein the rotor core comprises at least one magnet held in the rotor core, at least one magnet slot that holds the at least one magnet, and at least one coolant path extending along an axial direction of the rotor core, wherein the at least one coolant path is disposed between a radially-inner end surface of the at least one magnet and the at least one magnet slot, wherein the first end plate comprises a flange radially outside the radially-inner end surface of the at least one magnet, the flange protruding toward the rotor core along the axial direction of the rotor core, and wherein the flange is configured to form a cavity between the first end plate and the first end, wherein the cavity delivers the coolant supplied from the rotor shaft to the at least one coolant path, and wherein the first end plate has a first coolant outlet defined on an inner side relative to the at least one coolant path in a radial direction of the rotor core.

2. The motor according to claim 1, wherein the at least one magnet comprises a plurality of magnets, the at least one magnet slot comprises a plurality of magnet slots, and the at least one coolant path comprises a plurality of coolant paths, and the cavity delivers the coolant to the plurality of coolant paths for the plurality of magnets of the rotor core.

3. The motor according to claim 1, further comprising a second end plate attached to a second end of the rotor core, wherein the second end plate comprises a second coolant outlet having an opening overlapping at least partially with an opening of the first coolant outlet in the radial direction of the rotor core.

4. The motor according to claim 1, further comprising a second end plate attached to a second end of the rotor core, wherein the second end plate comprises a one-sided coolant outlet having an opening overlapping at least partially with an opening of the at least one coolant path in a radial direction of the rotor core.

5. The motor according to claim 4, wherein the rotor core is configured to supply the coolant only in a direction from the first end to the second end of the rotor core and discharge the coolant only from the one-sided coolant outlet.

6. The motor according to claim 5, wherein the one-sided coolant outlet is configured so that the discharged coolant is directed to an exposed part of the coil connected to a power line.

7. The motor according to claim 1, wherein the at least one coolant path extends along the axial direction of the rotor core between a circumferential end surface of the at least one magnet in a circumferential direction of the rotor core and the at least one magnet slot.

8. The motor according to claim 1, wherein the first end plate has an inner edge protruding toward the rotor core along the axial direction of the rotor core and positioned on a radially inner side relative to the at least one coolant path.

9. A motor comprising:

a stator with a coil; and a rotor radially inside the stator, wherein the rotor comprises a rotor shaft, a rotor core supported rotatably with the rotor shaft, and a first end plate attached to a first end of the rotor core, wherein the rotor core comprises at least one magnet held in the rotor core, at least one magnet slot that holds the at least one magnet, and at least one coolant path extending along an axial direction of the rotor core, wherein the at least one coolant path is disposed between a radially-inner end surface of the at least one magnet and the at least one magnet slot, wherein the first end plate comprises a flange radially outside the radially-inner end surface of the at least one magnet, the flange protruding toward the rotor core along the axial direction of the rotor core, and wherein the flange is configured to form a cavity between the first end plate and the first end, wherein the cavity delivers the coolant supplied from the rotor shaft to the at least one coolant path, and wherein the rotor has a plurality of pawls protruding toward the radially-inner end surface of the at least one magnet and fix the at least one magnet, wherein the plurality of pawls is arranged along a direction in which the at least one coolant path extends.

10. The motor according to claim 9, wherein the plurality of pawls is configured to press the radially-inner end surface of the at least one magnet by reaction force acting on the pawls.

11. The motor according to claim 10, wherein tips of the plurality of pawls are tilted toward a direction along which the coolant moves in the at least one coolant path.

* * * * *